US012660961B2

(12) United States Patent
Pierce et al.

(10) Patent No.: US 12,660,961 B2
(45) Date of Patent: Jun. 23, 2026

(54) KITCHEN APPLIANCE INCLUDING LOCATING FEATURES FOR FOOT ASSEMBLIES

(71) Applicant: Haier US Appliance Solutions, Inc., Wilmington, DE (US)

(72) Inventors: Andrew Pierce, Louisville, KY (US); Eric Matthew Lewis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 948 days.

(21) Appl. No.: 17/947,464

(22) Filed: Sep. 19, 2022

(65) Prior Publication Data

US 2024/0090704 A1 Mar. 21, 2024

(51) Int. Cl.
*A47J 43/07* (2006.01)

(52) U.S. Cl.
CPC .... *A47J 43/0705* (2013.01); *A47J 2043/0733* (2013.01)

(58) Field of Classification Search
CPC ........... A47J 43/0705; A47J 2043/0733; B01F 35/2117
See application file for complete search history.

(56) References Cited

U.S. PATENT DOCUMENTS

| | | | | |
|---|---|---|---|---|
| 2012/0081993 A1* | 4/2012 | Annis | ..................... | B01F 27/95 |
| | | | | 366/309 |
| 2018/0368615 A1* | 12/2018 | Luo | ........................ | A47J 27/082 |
| 2020/0359843 A1* | 11/2020 | Ye | .......................... | G01G 19/52 |
| 2021/0235935 A1* | 8/2021 | Noca | ..................... | A47J 43/046 |

FOREIGN PATENT DOCUMENTS

| | | |
|---|---|---|
| CN | 112556893 A | 3/2021 |
| EP | 1880647 A1 | 1/2008 |
| EP | 3845102 A1 | 7/2021 |
| WO | WO2007096574 A1 | 8/2007 |

* cited by examiner

*Primary Examiner* — Marc C Howell
(74) *Attorney, Agent, or Firm* — Dority & Manning, P.A.

(57) ABSTRACT

A kitchen appliance includes a casing including a base and a column extending from the base along the vertical direction, the casing defining an interior surface directed toward an interior cavity and an exterior surface directed away from the interior cavity, a pair of tabs protruding from the interior surface of the casing along the vertical direction toward the interior cavity of the casing, the pair of tabs being spaced apart from each other along the lateral direction to define a horizontal channel for receiving a load cell therein, and a pin protruding from the interior surface of the casing along the vertical direction toward the interior cavity of the casing, the pin being spaced apart from the pair of tabs along the transverse direction and disposed along the horizontal channel.

12 Claims, 6 Drawing Sheets

KITCHEN APPLIANCE INCLUDING LOCATING FEATURES FOR FOOT ASSEMBLIES

FIELD OF THE INVENTION

The present subject matter relates generally to kitchen appliances, and more particularly to stand mixer appliances.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. The motor may be provided in a motor housing attached to a base via a stand column. The base typically includes a plurality of feet or foot cups providing stability to the stand mixer upon a working surface.

Occasionally, these feet may be attached to weight sensors (such as load cells) to monitor a load within the stand mixer, a movement of the stand mixer during operation, or the like. The weight sensors rely on precise contact with the working surface to provide accurate readings and avoid triggering false errors. Thus, accurate placement and stability of the feet and weight sensors with respect to the base is paramount. However, existing stand mixers face several drawbacks. For one example, assembly and accurate placement of weight sensors within the base of the stand mixer can be difficult. Moreover, typical weight sensors (e.g., as mounted) are susceptible to contact with the base, resulting in false errors or inaccurate readings.

Accordingly, a stand mixer that obviates one or more of the above-mentioned drawbacks would be beneficial. In particular, a stand mixer incorporating precise locating features would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a kitchen appliance is provided. The kitchen appliance may include a casing including a base and a column extending from the base along the vertical direction, the casing defining an interior surface directed toward an interior cavity and an exterior surface directed away from the interior cavity; a pair of tabs protruding from the interior surface of the casing along the vertical direction toward the interior cavity of the casing, the pair of tabs being spaced apart from each other along the lateral direction to define a horizontal channel for receiving a load cell therein; and a pin protruding from the interior surface of the casing along the vertical direction toward the interior cavity of the casing, the pin being spaced apart from the pair of tabs along the transverse direction and disposed along the horizontal channel.

In another exemplary aspect of the present disclosure, a stand mixer is provided. The stand mixer may include a casing that includes a base, a column mounted to the base, and a motor housing mounted to the column and extending outwardly above the base, the casing forming an interior cavity; a motor provided within the motor housing; a pair of tabs protruding from an interior surface of the casing along the vertical direction toward the interior cavity, the pair of tabs being spaced apart from each other along the lateral direction to define a horizontal channel for receiving a load cell therein; and a pin protruding from the interior surface of the casing along the vertical direction toward the interior cavity, the pin being spaced apart from the pair of tabs along the transverse direction and disposed along the horizontal channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
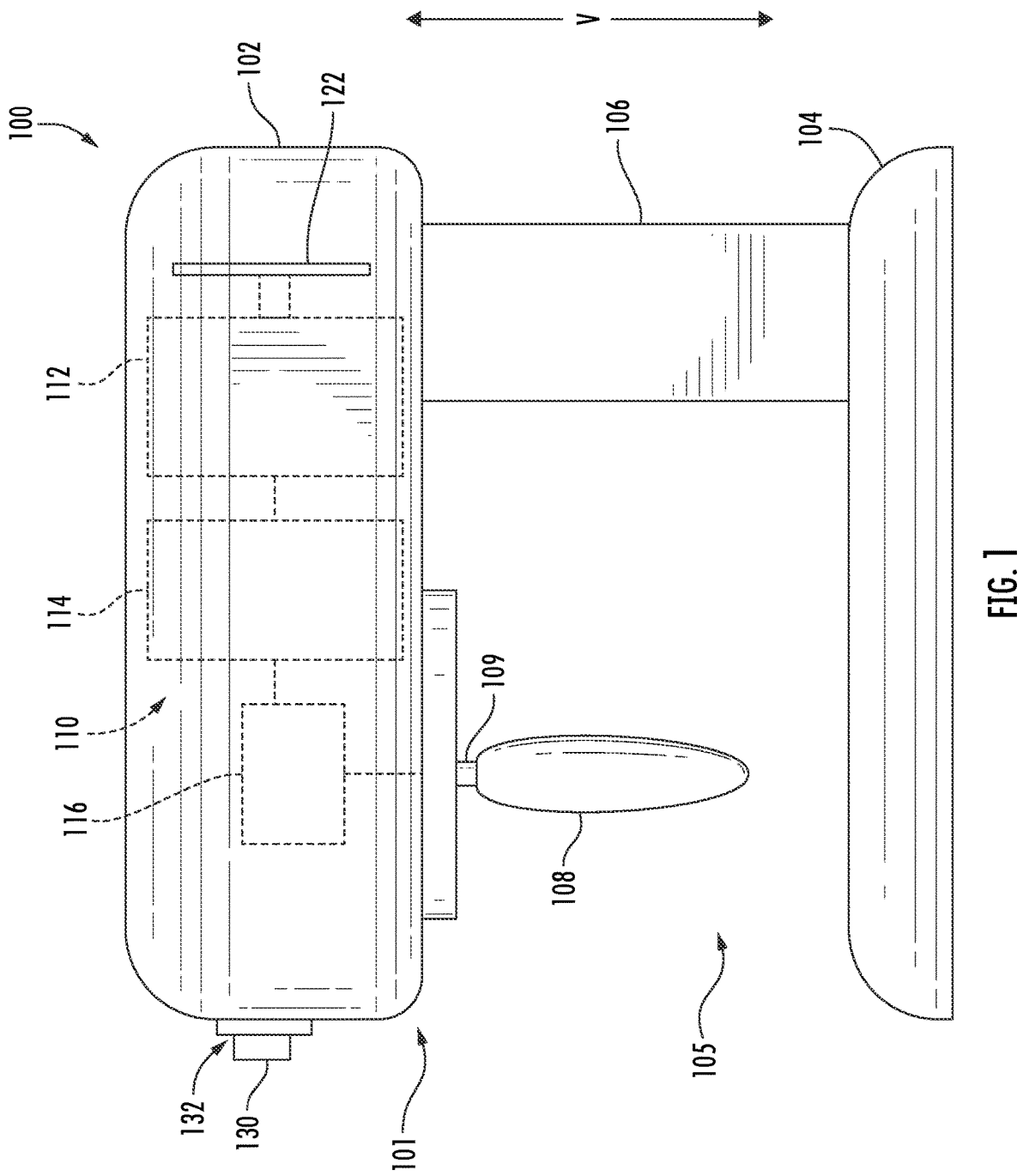
FIG. 1 provides a side section view of a stand mixer according to an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a planetary or reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. An opening 132 for a horizontal accessory shaft 130 may align with the rotational axis of motor 112. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102. The rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
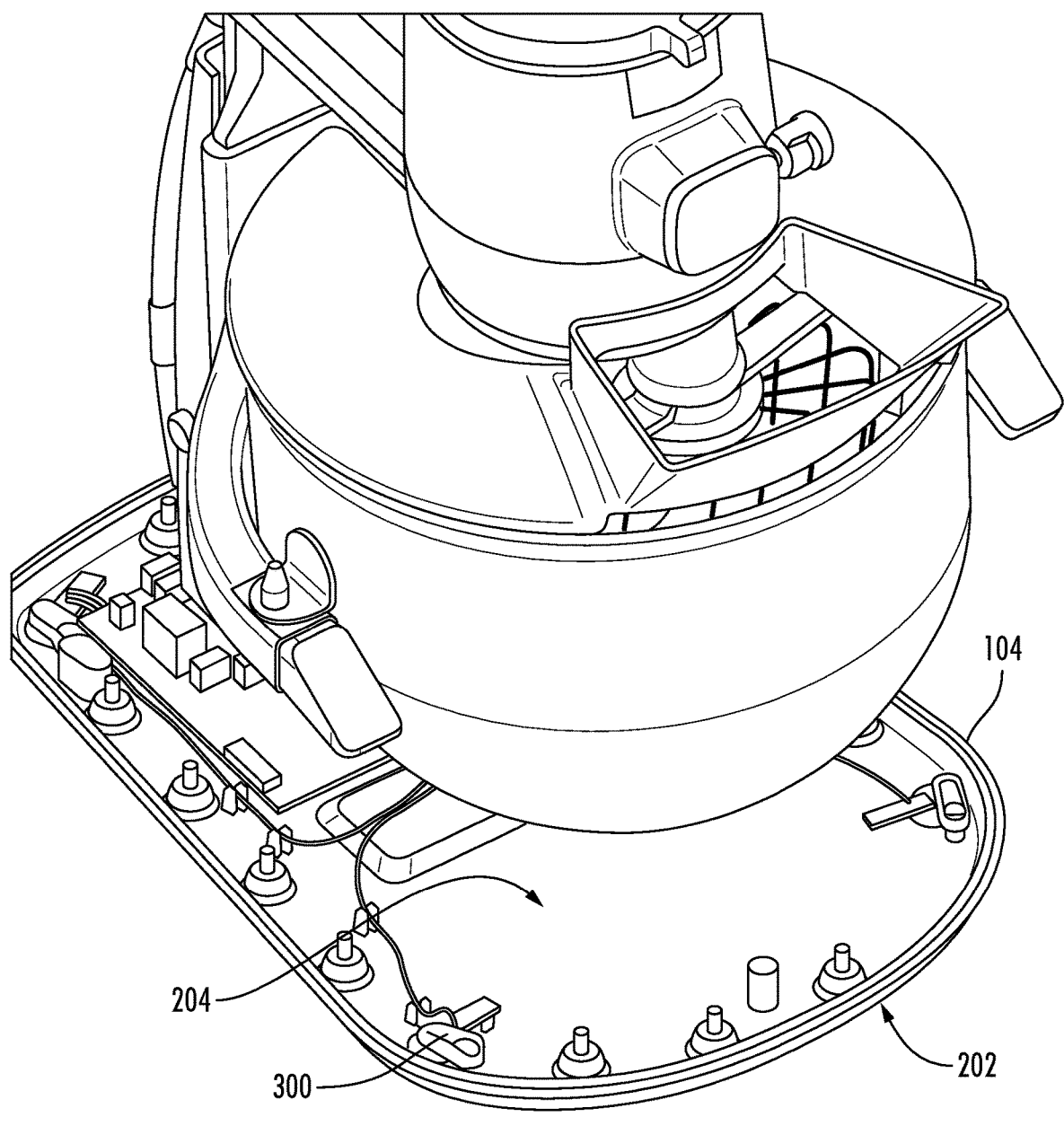
FIG. 2 provides a perspective view of the exemplary stand mixer of FIG. 1 with a column cover removed.

FIG. 2 provides an interior view of base 104 of stand mixer 100. In FIG. 2, a cover (e.g., covering base 104, column 106, or each of base 104 and column 106) is removed for the sake so clarity. Casing 101 may define an interior cavity 206. For instance, interior cavity 206 may be formed within each of base 104, column 106, and motor housing 102. A plurality of components (e.g., electrical components, mechanical components, control components, etc.) may be provided within interior cavity 206. For instance, casing 101 may define an exterior surface 202 and an interior surface 204. Interior surface 204 may be directed toward interior cavity 206 of casing 101 while exterior surface 202 is directed away from the interior cavity 206. One or more components may be selectively fixed or attached to interior surface 204 (e.g., of base 104 or column 106). For instance, as will be described below, stand mixer 100 may include a plurality of feet assemblies 300. Each foot assembly 300 may be selectively attached to casing 101 (e.g., to interior surface 204). Additionally or alternatively, each foot assembly 300 may protrude out of casing 101.

Figure 3:
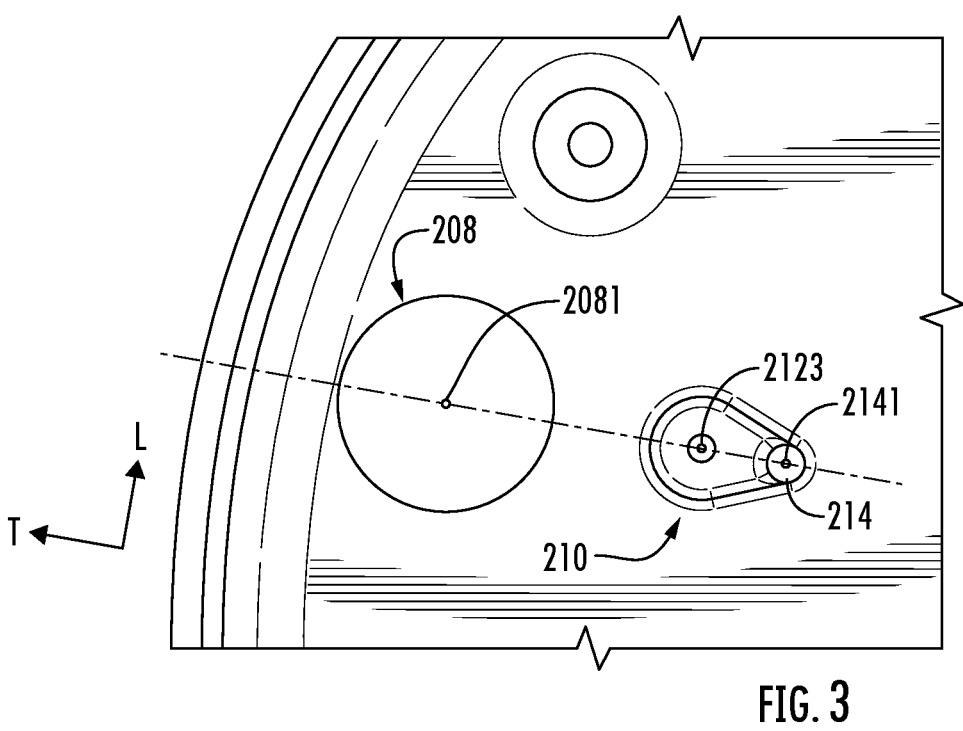
FIG. 3 provides a top view of an interior of a base of the exemplary stand mixer of FIG. 1.

Referring briefly to FIG. 3, an aperture 208 may be defined through casing 101. According to some embodiments, aperture 208 is formed in (e.g., through) base 104. Aperture 208 may allow fluid communication between interior cavity 206 and an external ambient atmosphere. For one example, a foot assembly 300 may protrude through aperture 208. A plurality of apertures 208 may be defined through casing 101, each aperture 208 respectively accommodating a foot assembly 300 (e.g., a portion thereof) therethrough. The plurality of apertures 208 may be spaced about a bottom of base 104. Accordingly, stand mixer 100 may be supported evenly by the plurality of feet assemblies 300.

Stand mixer 100 may include a load cell locator 210. Load cell locator 210 may be provided within interior cavity 206 of casing 101. For instance, load cell locator 210 may protrude from interior surface 204 of casing 101 (e.g., toward interior cavity 206). As will be explained, a load cell 400 (e.g., as part of foot assembly 300) may be selectively coupled to load cell locator 210. Moreover, briefly referring to FIGS. 3 and 6, load cell locator 210 may be spaced apart from aperture 208. Accordingly, foot assembly 300 may extend between load cell locator 210 and aperture 208.

Figure 4:
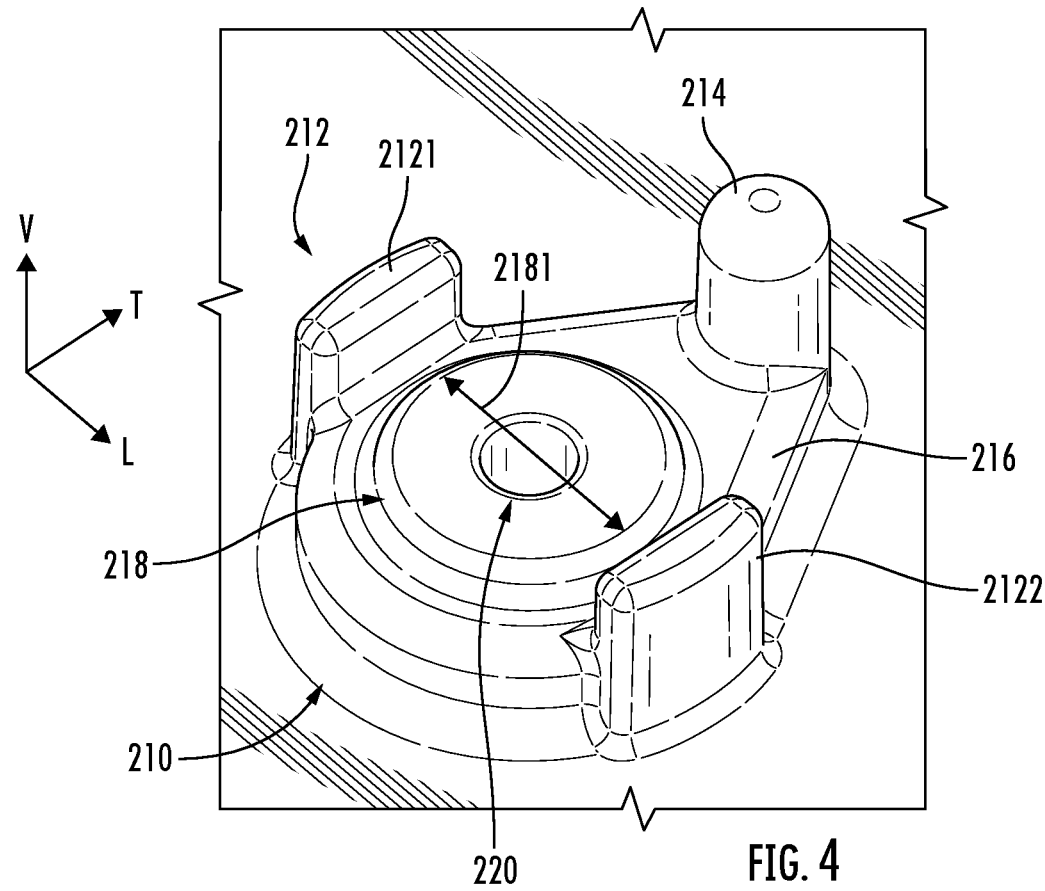
FIG. 4 provides a close-up perspective view of the interior of the base of FIG. 3.
Figure 5:
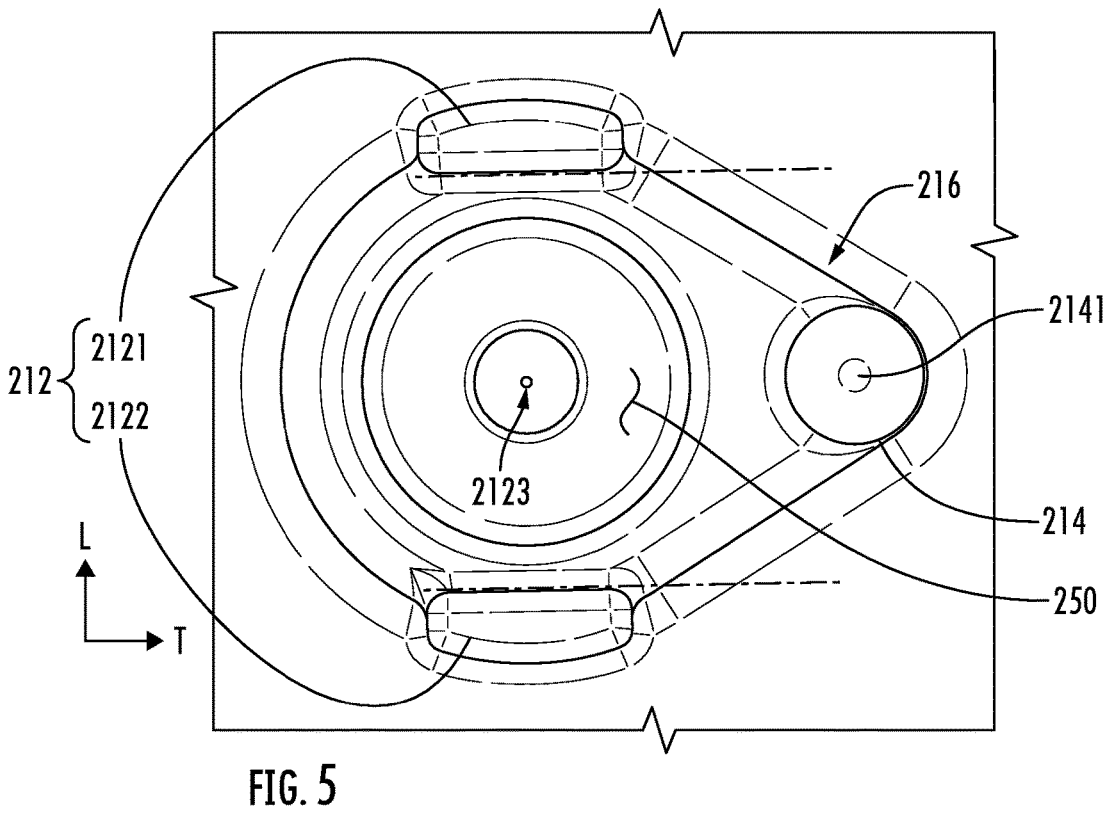
FIG. 5 provides a top view of the interior of the base of FIG. 4.

Referring now chiefly to FIGS. 4 and 5, load cell locator 210 may be formed integrally with casing 101. For instance, load cell locator 210 may be molded, machined, or otherwise shaped continuously with casing 101. Load cell locator 210 may include a pair of tabs 212. The pair of tabs 212 may include a first tab 2121 and a second tab 2122. The pair of tabs 212 may protrude from interior surface 204 of casing 101. According to some embodiments (e.g., FIGS. 2 through

7), the pair of tabs 212 protrude from base 104 (e.g., upward along the vertical direction V away from base 104). According to other embodiments (e.g., FIGS. 8 through 10), the pair of tabs 212 protrude from column 106 (e.g., downward along the vertical direction V toward base 104). Additionally or alternatively, each of the pair of tabs 212 may protrude to a first predetermined length from casing 101 (e.g., along the vertical direction V).

The pair of tabs 212 may be spaced apart from each other. For instance, first tab 2121 may be spaced apart from second tab 2122 along the lateral direction L. It should be understood that the lateral direction L is used by way of example only, and that the spacing direction may vary according to embodiments. For instance, first tab 2121 and second tab 2122 may be spaced apart along a direction perpendicular to a spacing direction between load cell locator 210 and aperture 208. Accordingly, a gap having a predetermined width may be formed between first tab 2121 and second tab 2122. In particular, the pair of tabs 212 may collectively define a horizontal (e.g., along the transverse direction T) channel 250 for receiving a portion of load cell 400 therein (e.g., as part of foot assembly 300).

Load cell locator 210 may include a pin 214. Pin 214 may protrude from interior surface 204 of casing 101. For instance, similar to the pair of tabs 212 and according to some embodiments (e.g., FIGS. 2 through 7), pin 214 protrudes from base 104 (e.g., upward along the vertical direction V away from base 104). According to other embodiments (e.g., FIGS. 8 through 10), pin 214 protrudes from column 106 (e.g., downward along the vertical direction V toward base 104). Accordingly, pin 214 may be parallel with the pair of tabs 212 along the vertical direction V.

Pin 214 may be spaced apart from the pair of tabs 212. For instance, pin 214 may be spaced apart from the pair of tabs 212 along the transverse direction T. Additionally or alternatively, pin 214 may be located opposite the pair of tabs 212 from aperture 208. In detail, a center point 2081 of aperture 208, a midpoint 2123 between the pair of tabs 212, and a center point 2141 of pin 214 may be colinear (e.g., as shown in FIG. 3). Accordingly, pin 214 may be positioned along the horizontal channel 250 formed between the pair of tabs 212.

Figure 7:
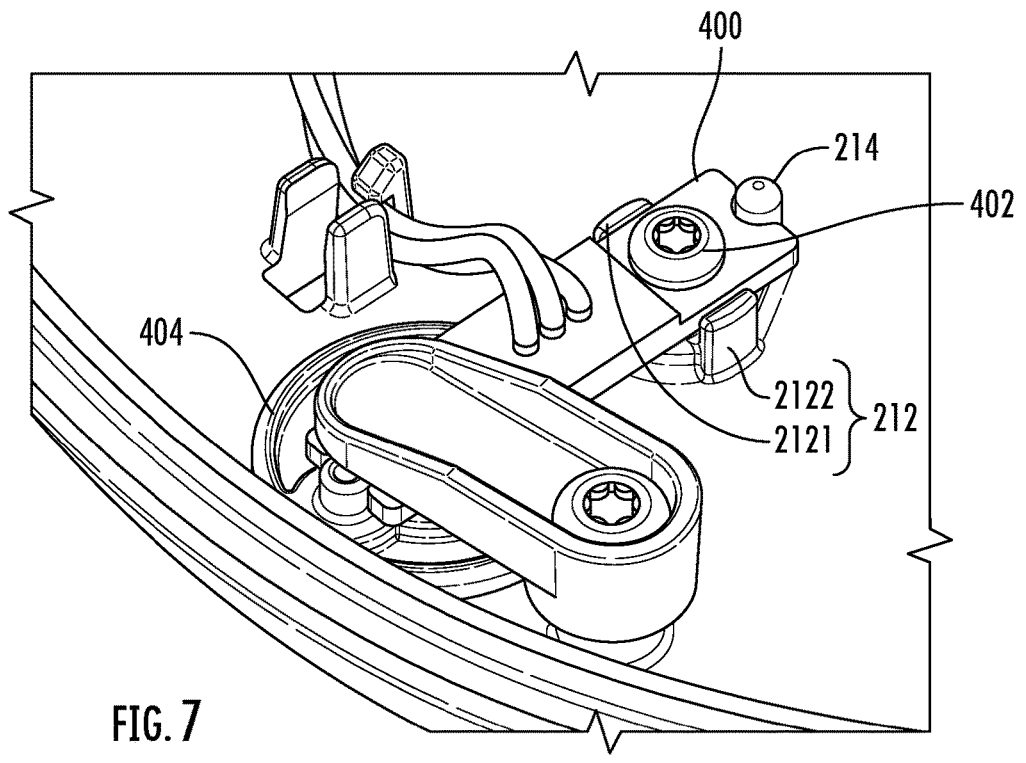
FIG. 7 provides a perspective view of the exemplary load cell assembly of FIG. 6.

Pin 214 may functionally interact with load cell 400 when foot assembly 300 is attached to load cell locator 210. For example, pin 214 assists in properly and accurately locating load cell 400 with respect to aperture 208. Advantageously, precise positioning of foot assembly 300 may be ensured by the pair of tabs 212 and pin 214. For one example, as seen in FIG. 7, pin 214 is received within a groove defined in an outer edge of load cell 400. Accordingly, pin 214 may restrict a movement of load cell 400 about the transverse direction T, for example. However, as will be described in more detail below, pin 214 may be selectively received within a fully enclosed hole defined in load cell 400, thus restricting any horizontal movement or rotation of load cell 400.

Load cell locator 210 may include a boss 216. For instance, similar to the pair of tabs 212 and pin 214, and according to some embodiments (e.g., FIGS. 2 through 7), boss 216 protrudes from base 104 (e.g., upward along the vertical direction V away from base 104). According to other embodiments (e.g., FIGS. 8 through 10), boss 216 protrudes from column 106 (e.g., downward along the vertical direction V toward base 104). Accordingly, boss 216 may be parallel with the pair of tabs 212 and pin 214 along the vertical direction V.

Boss 216 may be integral with each of the pair of tabs 212 and pin 214. Additionally or alternatively, boss 216 may be provided between the pair of tabs 212 (e.g., along the lateral direction L). Moreover, boss 216 may be located between pin 214 and aperture 208 (e.g., along the transverse direction T). Boss 216 may protrude from casing 101 (e.g., from interior surface 204) to a second predetermined length. For example, the second predetermined length of boss 216 is less than the first predetermined length of the pair of tabs 212. Accordingly, a receiving or reception zone may be formed between the pair of tabs 212 (e.g., the horizontal channel 250) and spaced apart from casing 101 (e.g., interior surface 204) by the second predetermined length.

Load cell locator 210 may include a step or step portion 218. Step 218 may protrude from boss 216. In detail, step 218 may protrude along the vertical direction V from a top surface 2161 of boss 216 (e.g., according to some embodiments as shown in FIGS. 2 through 7). Step 218 may define a diameter (or, e.g., a length along the lateral direction L) 2181. Diameter 2181 of step 218 may be smaller than the distance between first tab 2121 and second tab 2122 (e.g., along the lateral direction L). For instance, a first gap or groove may be formed between step 218 and first tab 2121, and a second gap or groove may be formed between step 218 and second tab 2122. Advantageously, load cell 400 may be easily received within the horizontal channel 250 defined between the pair of tabs 212. For instance, step 218 may prevent any interference between load cell 400 and machined edges (e.g., machined radii) of the pair of tabs 212 and boss 216, ensuring accurate readings (e.g., weight or movement readings) and reducing false triggers.

Load cell locator 210 may include a fastener hole 220. Fastener hole 220 may be defined in or through step 218 (e.g., along the vertical direction V). For instance, fastener hole 220 may be formed through step 218 and boss 216 along the vertical direction V. Fastener hole 220 may be formed to accommodate a fastener, such as a screw, a bolt, a rivet, a peg, or the like. Accordingly, fastener hole 220 may be grooved (e.g., threaded) in some instances.

Fastener hole 220 may be a through hole (e.g., defined through casing 101). However, according to some embodiments, fastener hole 220 is a blind hole (e.g., defined from interior surface 204 toward exterior surface 202). Fastener hole 220 may be positioned at or near a center of step 218. For instance, fastener hole 220 may be axially aligned with midpoint 2123 between the pair of tabs 212 (e.g., along the vertical direction V). Thus, a fastener may be inserted through load cell 400 and received within fastener hole 220 to secure load cell 400 (e.g., foot assembly 300) to casing 101.

Figure 6:
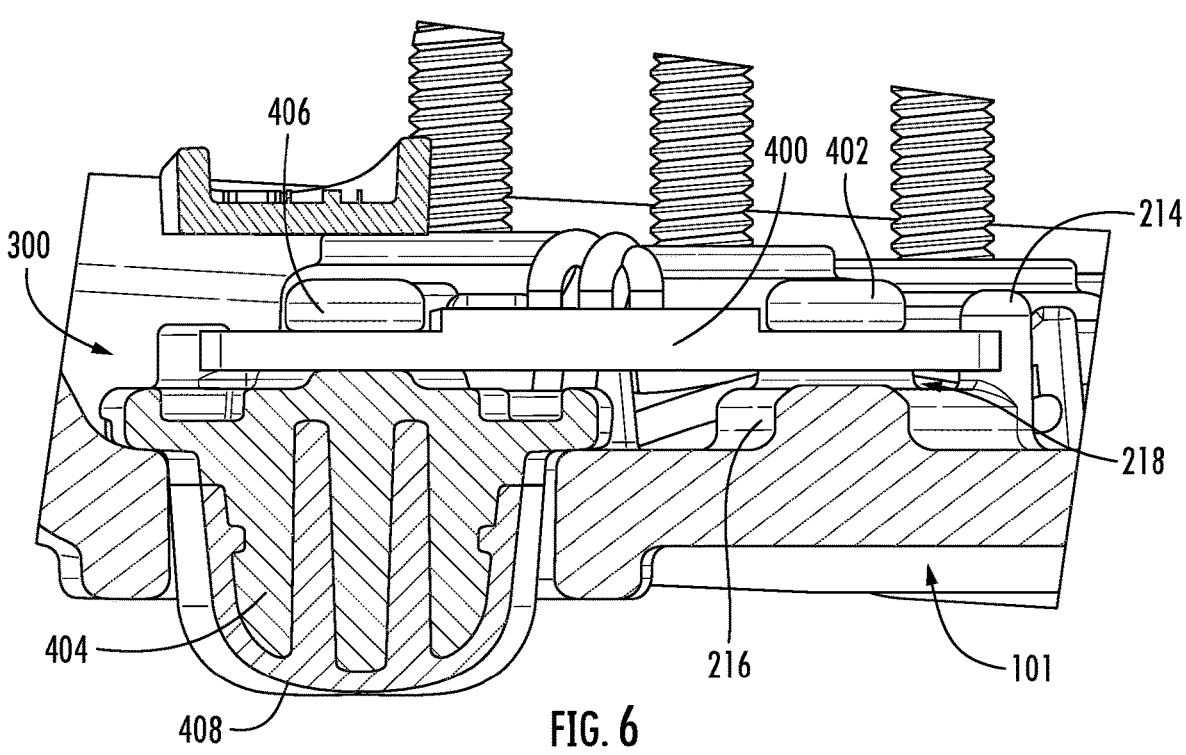
FIG. 6 provides a side section view of an exemplary load cell assembly of the exemplary stand mixer of FIG. 1.

Referring briefly to FIG. 6, foot assembly 300 will be described. As mentioned above, foot assembly 300 may provide a contact point for stand mixer 100 with a working surface (e.g., a countertop, a table, etc.). A plurality of feet assemblies 300 may be provided within casing 101, thus providing a plurality of contact points. Foot assembly 300 may include load cell 400, a first fastener 402 selectively connected a first end of load cell 400 to load cell locator 210, a foot 404 accommodated within aperture 208 and selectively attached to a second end of load cell 400, and a second fastener 406 provided through the second end of load cell 400 and received within foot 404.

Foot 404 may include a rubber sole 408. Rubber sole 408 may be configured to contact the working surface upon which stand mixer 100 sits. For instance, a movement of stand mixer 100 with respect to the working surface may be restricted by rubber sole 408. Coincidentally, a strain may be placed on load cell 400, which may in turn be transmitted to controller 122. Additionally or alternatively, a weight of stand mixer 100 may be detected by a flexion of load cell 400 and determined at controller 122. Due to the precision of placement of load cell 400 and foot assembly 300 as a whole, accurate measurements may be ensured relating to stand mixer 100 and movement or weight thereof (e.g., by preventing physical contact between foot 404 and aperture 208).

Figure 8:
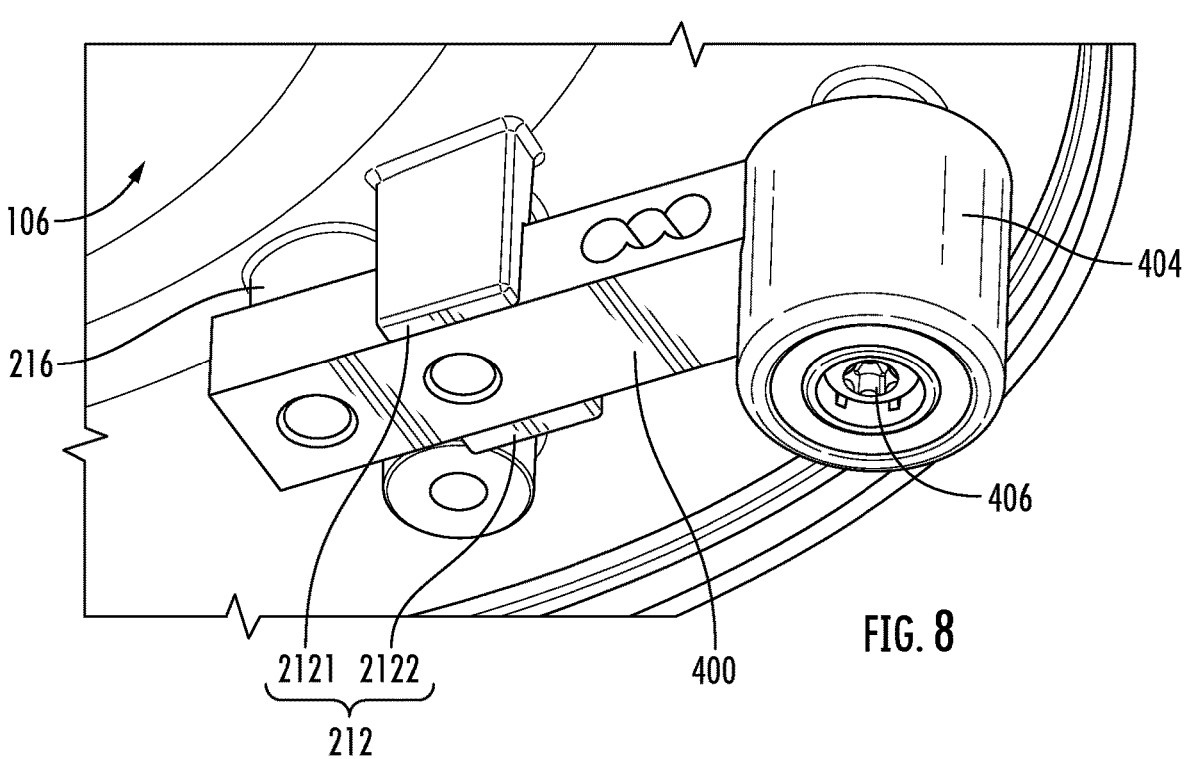
FIG. 8 provides a lower perspective view of an exemplary load cell assembly according to another embodiment.
Figure 9:
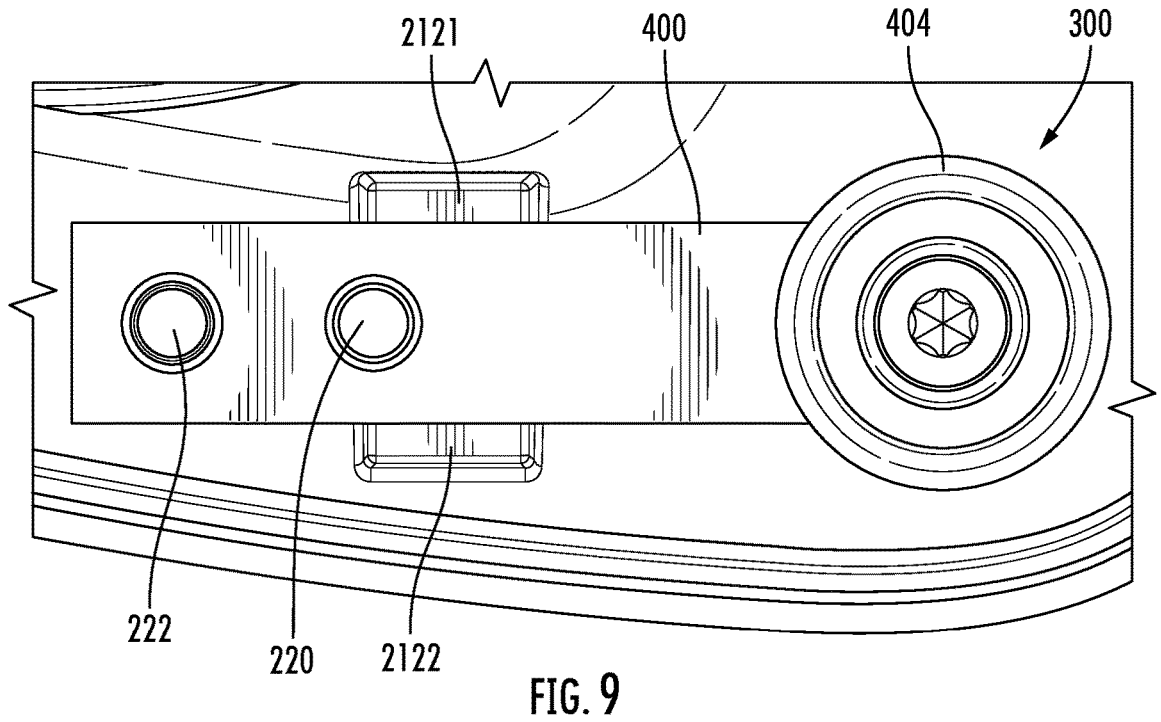
FIG. 9 provides a bottom view of the exemplary load cell assembly of FIG. 8.
Figure 10:
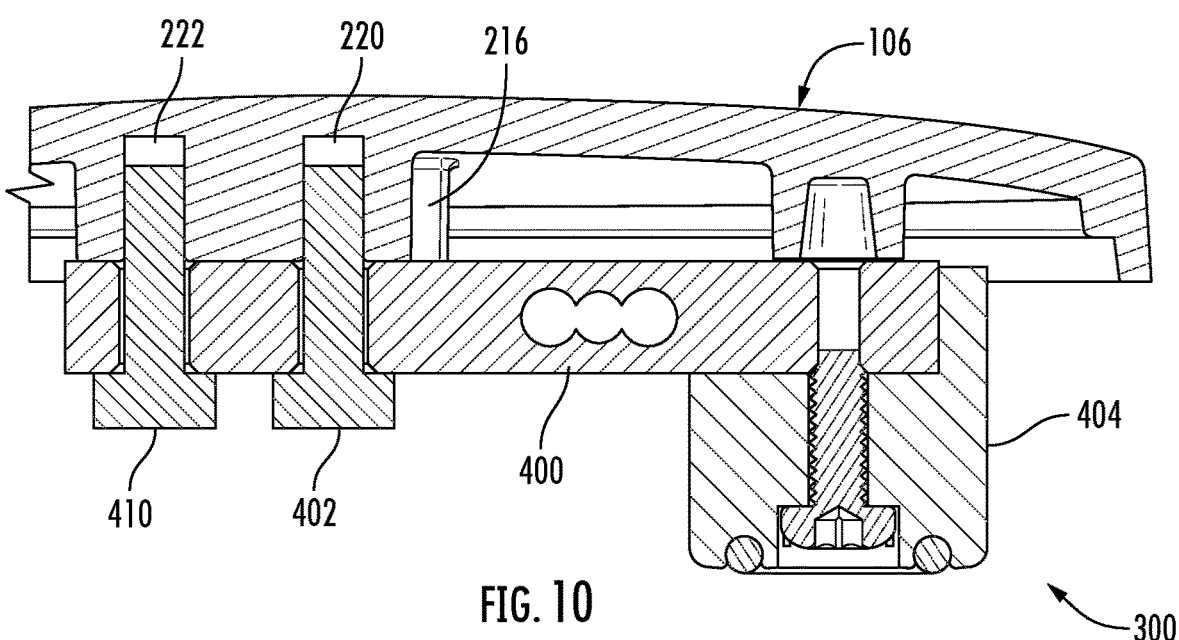
FIG. 10 provides side section view of an exemplary load cell assembly of FIG. 8.

Referring now to FIGS. 8 through 10, another embodiment of load cell locator 210 will be described. In FIGS. 8 through 10, like reference numerals refer to like features described above with reference to FIGS. 2 through 7. Accordingly, repeat descriptions will be omitted for the sake of brevity, and notable differences will be described.

According to another embodiment, load cell locator 210 is provided on column 106 as opposed to base 104. In detail, load cell locator 210 may protrude downward along the vertical direction V from interior surface 204 of column 106. Load cell locator 210 may include the pair of tabs 212 including first tab 2121 and second tab 2122 spaced apart from each other (e.g., along the lateral direction L). Load cell locator 210 may include boss 216 provided between the pair of tabs 212. The horizontal channel 250 may be formed between the pair of tabs 212. Foot assembly 300 (e.g., load cell 400) may be selectively received within the horizontal channel 250.

Load cell locator 210 according to this embodiment may include a first fastener hole. For instance, fastener hole 220 may be referred to as a first fastener hole. First fastener hole 220 may be located at least partially between the pair of tabs 212. Load cell locator 210 may include a second fastener hole 222. Second fastener hole 222 may be defined through boss 216. According to some embodiments, a second boss is provided through which second fastener hole 222 is defined. A center point of first fastener hole 220, a center point of second fastener hole 222, and center point 2081 of aperture 208 may be colinear (e.g., along the transverse direction T).

According to this embodiment, foot assembly 300 may include first fastener 402 attaching the first end of load cell 400 to load cell locator 210, second fastener 406 attaching foot 404 to second end of load cell 400, and pin 410. Pin 410 may be provided through load cell 400 and may be selectively received within second fastener hole 222. For instance, pin 410 may be functionally equivalent to pin 214. Accordingly, pin 410 may prevent a movement of load cell 400 about a horizontal direction (i.e., perpendicular to the vertical direction V). Additionally or alternatively, pin 410 may provide additional support to the first end of load cell 400 with respect to load cell locator 210. Thus, pin 410 may be removably coupled to column 106. Pin 410 may be a fastener (similar to fastener 402) such as a screw, a bolt, a rivet, a peg, or the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A kitchen appliance defining a vertical direction, a lateral direction, and a transverse direction, the kitchen appliance comprising:

a casing comprising a base and a column extending from the base along the vertical direction, the casing defining an interior surface directed toward an interior cavity and an exterior surface directed away from the interior cavity;

a pair of tabs protruding from the interior surface of the casing along the vertical direction toward the interior cavity of the casing, the pair of tabs being spaced apart from each other along the lateral direction to define a horizontal channel for receiving a load cell therein;

a boss protruding from the interior surface of the casing along the vertical direction, the boss being provided between the pair of tabs along the lateral direction, the boss defining a step, the step protruding from the boss away from the casing, the step defining a fastener hole, the fastener hole being defining along the vertical direction through the step and the boss, wherein a length of the step along the lateral direction is less than a distance between the pair of tabs along the lateral direction; and a pin protruding from the interior surface of the casing along the vertical direction toward the interior cavity of the casing, the pin being spaced apart from the pair of tabs along the transverse direction and disposed along the horizontal channel.

2. The kitchen appliance of claim 1, wherein a protruding length of the pair of tabs along the vertical direction is greater than a protruding length of the boss along the vertical direction.

3. The kitchen appliance of claim 1, wherein the base defines an aperture, the aperture being spaced apart from the pair of tabs along the transverse direction opposite the pin.

4. The kitchen appliance of claim 1, wherein the pair of tabs and the pin protrude from the base.

5. The kitchen appliance of claim 4, wherein the pair of tabs and the pin are integrally formed with the base as a single piece.

6. The kitchen appliance of claim 1, wherein the pair of tabs and the pin protrude from the column.

7. The kitchen appliance of claim 6, wherein the pin is removably coupled to the column.

8. A stand mixer defining a vertical direction, a lateral direction, and a transverse direction, the stand mixer comprising:

a casing that comprises a base, a column mounted to the base, and a motor housing mounted to the column and extending outwardly above the base, the casing forming an interior cavity;

a motor provided within the motor housing;

a pair of tabs protruding from an interior surface of the casing along the vertical direction toward the interior cavity, the pair of tabs being spaced apart from each other along the lateral direction to define a horizontal channel for receiving a load cell therein;

a boss protruding from the interior surface of the casing along the vertical direction, the boss being provided between the pair of tabs along the lateral direction, the boss defining a step, the step protruding from the boss away from the casing, the step defining a fastener hole, the fastener hole being defined along the vertical direction through the step and the boss, wherein a length of the step along the lateral direction is less than a distance between the pair of tabs along the lateral direction; and a pin protruding from the interior surface of the casing along the vertical direction toward the interior cavity, the pin being spaced apart from the pair of tabs along the transverse direction and disposed along the horizontal channel.

9. The stand mixer of claim 8, wherein a protruding length of the pair of tabs along the vertical direction is greater than a protruding length of the boss along the vertical direction.

10. The stand mixer of claim 8, wherein the pair of tabs and the pin protrude from the base.

11. The stand mixer of claim 8, wherein the pair of tabs and the pin protrude from the column.

12. The stand mixer of claim 8, wherein the base defines an aperture, the aperture being spaced apart from the pair of tabs along the transverse direction opposite the pin.

* * * * *